June 23, 1942.　　H. W. PRICE ET AL　　2,287,272
CLUTCH AND TRANSMISSION OPERATING MECHANISM
Filed June 22, 1939　　5 Sheets-Sheet 1
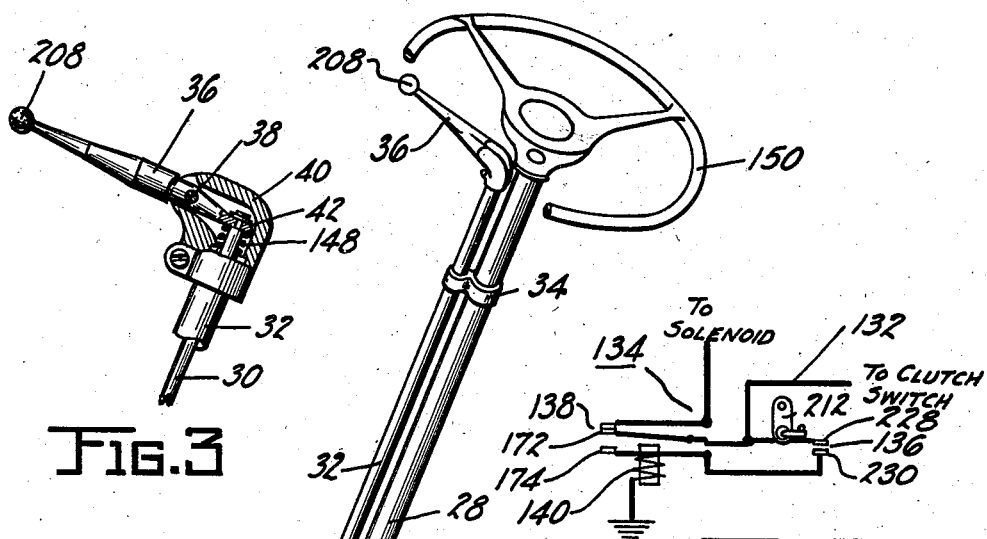
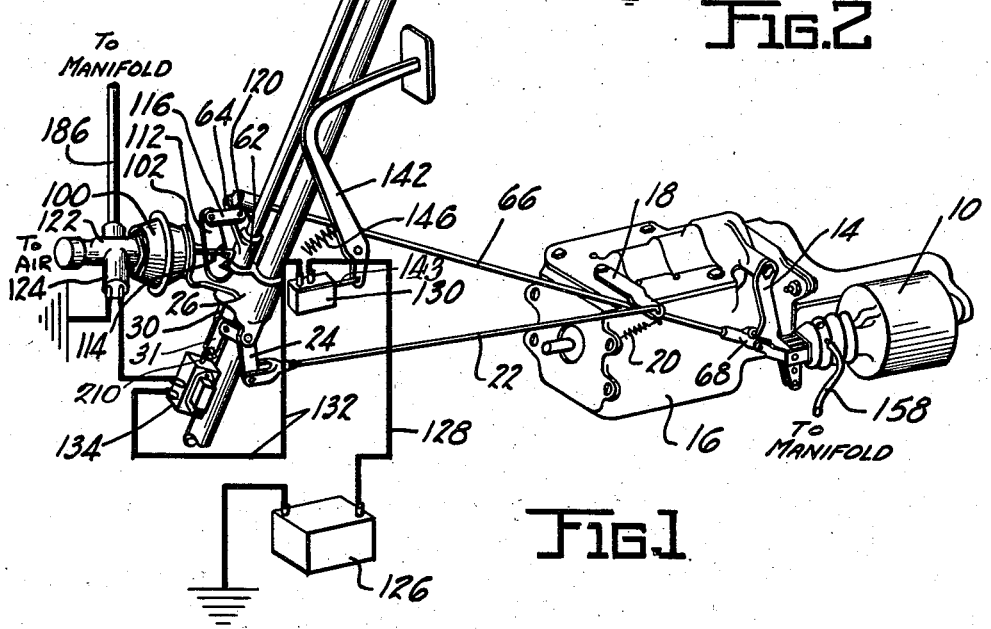
INVENTOR.
HAROLD W. PRICE
EARL R. PRICE
BY
H. O. Clayton
ATTORNEY.

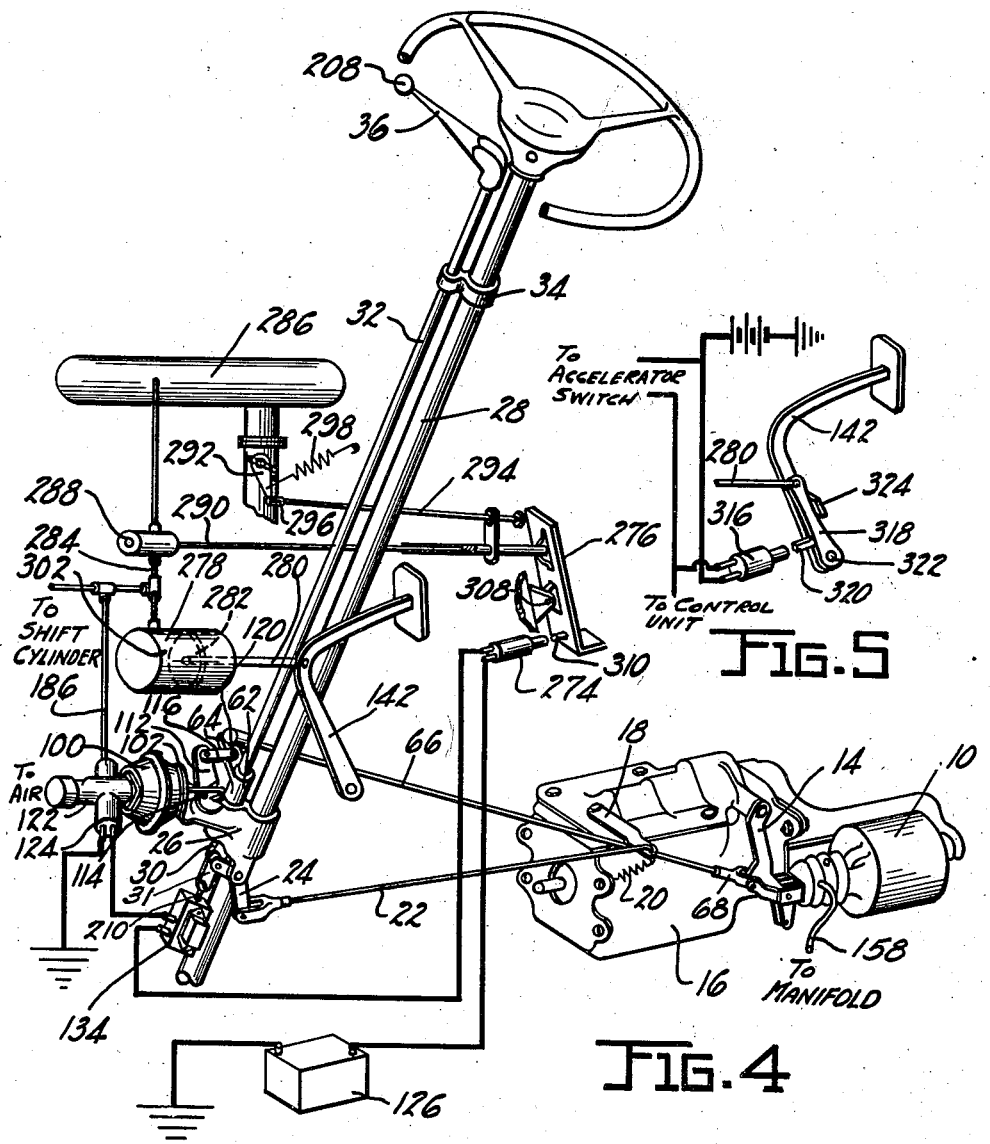

June 23, 1942.    H. W. PRICE ET AL    2,287,272
CLUTCH AND TRANSMISSION OPERATING MECHANISM
Filed June 22, 1939    5 Sheets-Sheet 3

INVENTOR.
HAROLD W. PRICE
EARL R. PRICE
BY
ATTORNEY.

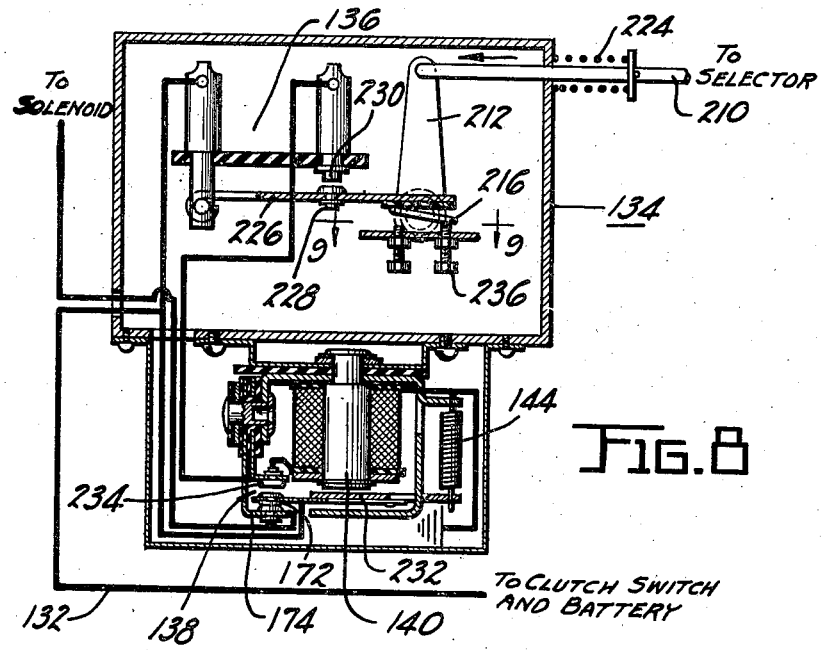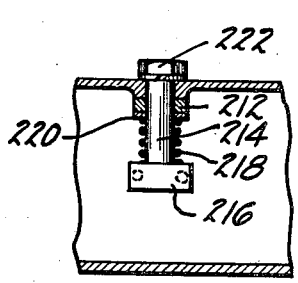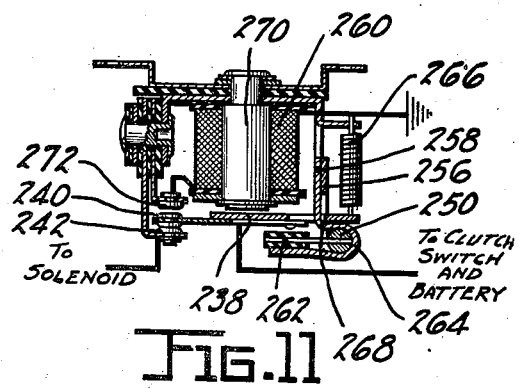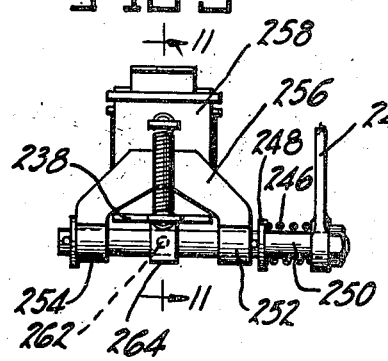

June 23, 1942. H. W. PRICE ET AL 2,287,272
CLUTCH AND TRANSMISSION OPERATING MECHANISM
Filed June 22, 1939  5 Sheets—Sheet 5

INVENTOR.
HAROLD W. PRICE
EARL R. PRICE
BY
ATTORNEY.

Patented June 23, 1942

2,287,272

UNITED STATES PATENT OFFICE 2,287,272

CLUTCH AND TRANSMISSION OPERATING MECHANISM

Harold W. Price and Earl R. Price, South Bend, Ind., assignors to Bendix Aviation Corporation, South Bend, Ind., a corporation of Delaware Application June 22, 1939, Serial No. 280,610

9 Claims. (Cl. 192—.01)

This invention relates in general to transmissions, and particularly to a mechanism for operating the three-speeds forward and reverse transmission of an automotive vehicle.

An object of the invention is to provide a simple and compact transmission operating mechanism including means for selecting the shift rail to be actuated and a pressure differential operated motor for actuating the selected rail, resulting in placing the transmission in the desired gear ratio.

One of the principal objects of the invention is to provide means, including a plurality of manually operated members, preferably a pedal operated by the foot of the driver and a lever mounted beneath the steering wheel, for actuating the control valve of the aforementioned motor, one of said members serving, in part, to control power means for operating the valve and the other serving as a part of manually operated means for operating the valve.

Yet another object of the invention is to provide power means for actuating the change-speed transmission of an automotive vehicle, said power means being controlled by a selector mounted within easy reach of the driver, preferably beneath the steering wheel, or by said selector operating in conjunction with either the clutch pedal or the accelerator pedal.

Another object of the invention is to provide, in power means for operating an automotive transmission, a valve operating motor, said motor being controlled in part by a selector mounted within easy reach of the driver and in part by the clutch pedal.

Yet another object of the invention is to provide, in a transmission operating mechanism, two manually operated members, the operation of the mechanism being such that with operation of one of said members in conjunction with a certain operation of the clutch there results a selection of a shift rail to be operated and then an actuation of the selected rail to place the transmission in the desired gear ratio, the operation of the other of said members resulting in an operation of the mechanism to actuate the second and high gear shift rail only.

Yet another object of the invention is to provide, in the mechanism for actuating the control valve of a transmission operating motor, two manually operated members, one of said members serving to control power operated means for actuating the valve and the other member serving as a part of means for cutting said power means out of operation.

Yet another object of the invention is to provide pressure differential operated power means for actuating a shift rail of the transmission to thereby establish the transmission in gear, said power means being controlled in part by a manually operated selector for so controlling the power means as to effect any one of the operations of the transmission and being controlled in part by another manually operated means for so controlling the power means as to alternately effect a second and high gear operation of the transmission, the mechanism being so constructed that the second-mentioned control means may be overruled or cut out of operation, at the will of the driver.

Yet another object of the invention is to provide means for operating the transmission of an automotive vehicle, said means including a hand operated selector member movable in three different planes to effect an operation of the transmission operating means, and further including a foot operated member operable to effect alternately a second gear and a high gear operation of the transmission operating means.

It is a further object of the invention to provide a manually operated member, preferably a foot operated pedal, mounted on the floor of the driver's compartment for controlling the throttle, the clutch and the transmission of the vehicle.

Yet another object of the invention is to provide power means for operating the clutch and transmission of the vehicle, said means including the accelerator pedal operable in one position to so control the operation of the power means as to effect a disengagement of the clutch and operable in another position to so control the operation of the power means as to effect either a second gear operation of the transmission or a high gear operation thereof.

Other objects of the invention and desirable details of construction and combinations of parts will become apparent from the following detailed description of certain embodiments of the invention, taken in conjunction with the accompanying drawings illustrating said embodiments, in which:

Figure 1 is a digrammatic view disclosing the principal elements of one embodiment of our invention;

Figure 2 is a wiring diagram of most of the electrical mechanism of the invention disclosed in Figure 1;

Figure 3 is an enlarged view, partly in section, disclosing, in detail, the selector which is mounted beneath the steering wheel;

Figure 4 is a diagrammatic view, similar to Figure 1, disclosing another embodiment of our invention;

Figure 5 is a fragmentary view of the clutch pedal disclosed in Figures 1 and 4, showing another embodiment of our invention;

Figure 8 is a sectional view disclosing details of the electrical control unit disclosed in Figures 1 and 4, including a so-called hold-down unit and a selector operated switch;

Figure 9 is a sectional view, taken on the line 9—9 of Figure 8, disclosing details of the selector operated switch;

Figure 6:
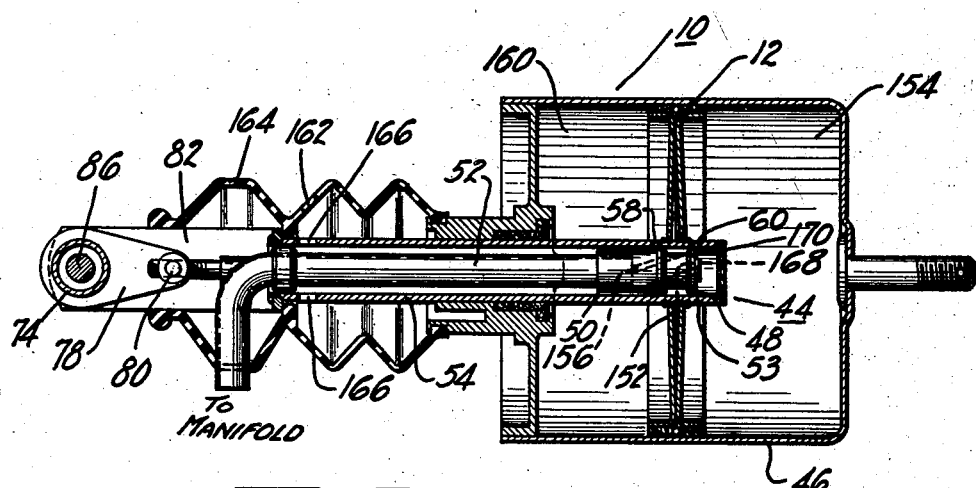
Figure 6 is a sectional view of the double-acting vacuum motor for operating the shift rails of the transmission.
Figure 12:
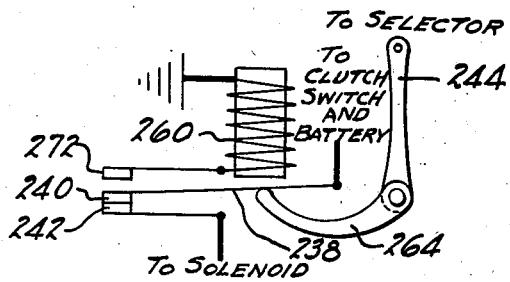
Figure 13:
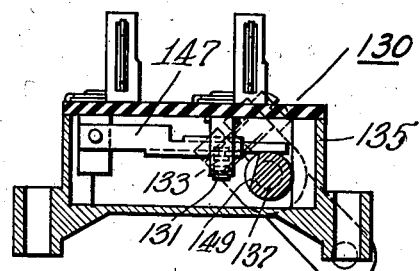
Figures 14, 15:
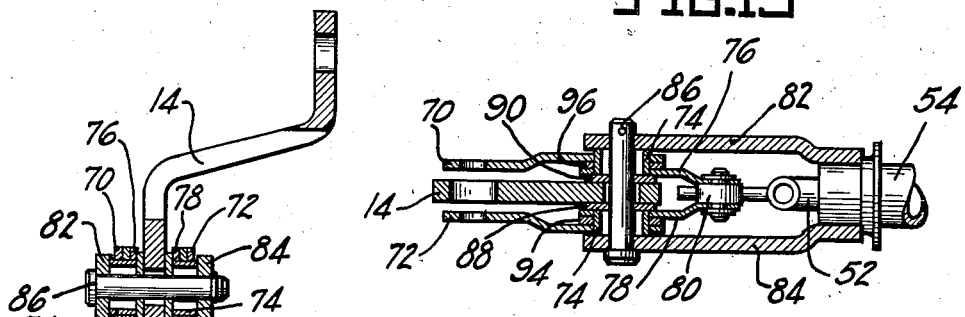
Figure 17:
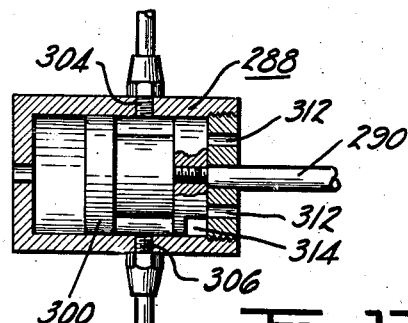
Figure 16:
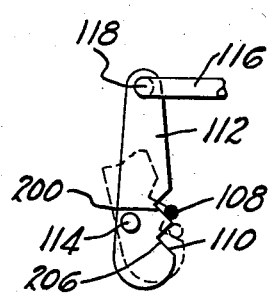

Figure 10 discloses, in side elevation, a modified form of control unit for overruling the selector control of our transmission operating mechanism;

Figure 11 is a sectional view of the control unit disclosed in Figure 10, taken on the line 11—11 thereof;

Figure 12 is a diagrammatic view of the so-called overruling mechanism disclosed in Figures 10 and 11;

Figure 13 is a sectional view disclosing, in detail, the clutch pedal operated cut-in switch;

Figures 14 and 15 are sectional views disclosing details of the linkage for operating the motor controlling valve disclosed in Figure 6;

Figure 16 is an enlarged view of the motor operated cam disclosed in Figure 1; and Figure 17 is a sectional view disclosing the details of the accelerator operated three-way valve of Figure 4.

There is disclosed in Figure 1 of the drawings one embodiment of our invention, including a double-acting vacuum operated motor 10, the piston or power element 12 of which is operably connected to a crank 14, which, when rotated, actuates the shift rail operating mechanism of a present-day three-speeds forward and reverse transmission 16. This transmission is not disclosed in detail, inasmuch as the same is well known to those skilled in this art: furthermore, the motor 10 will be described in detail hereinafter and is disclosed in section in Figure 6. The transmission operating mechanism also includes a crank 18, which, when rotated counterclockwise, serves to actuate the so-called selector mechanism of the transmission to make possible an operation of the first and reverse shift rail thereof. This crank may be biased, by a spring 20, to the position shown in Figure 1, in which position the second and high gear shift rail is selected for operation. A shift rail having been selected for operation, the motor 10 is then energized, resulting in a movement of said rail to place the transmission in the desired gear ratio.

The invention disclosed in Figure 1 lies in the power and manually operated mechanism for operating the cranks 14 and 18 and will now be described in detail. The crank 18 is rotated clockwise by manually operated means including a link 22 connected to a bell crank 24, which is mounted on a bracket 26 secured to the steering column 28 of the vehicle. To one end of the crank 24 there is secured a link 30 telescoped within a tube 32, said tube being secured to the steering column by the bracket 26 and a bracket 34. A manually operated selector member 36 is pivotally connected at 38 to a member 40 mounted on the end of the tube 32, and the link 30 is connected at 42 to the inner end of the selector 36.

Describing the power means for actuating the shift rail operating crank 14, a valve 44 for controlling the operation of the motor 10 is located within the casing 46 of the motor. This valve comprises a spool-shaped member 48 secured by a shank 50 to a hollow tube 52. The end portion 53 of a connecting rod 54 constitutes the other part of the valve and is ported at 58 and 60. Reciprocable movement of the valve member 48 is effected by clockwise or counterclockwise rotation of the selector 36 in either one of two planes of movement, said rotation causing the tube 32 to rotate. To the tube 32 is connected a sleeve 62 having a crank 64 extending therefrom, and the valve member 48 is connected to the crank 64 by means of a link 66, a fork 68 secured to the end of the link 66, links 70 and 72, Figure 15, a hollow pin 74, links 76 and 78, an adjustable connection 80 and the tube 52. Completing the description of the linkage for operating the valve 44, the rod 54 is connected to the crank 14 by links 82 and 84, a pin 86, lever members 88 and 90 and a pin 92. Each of lever members 94 and 96 is pivotally connected at one end to the crank 14 by a pin 98 and is pivotally connected at its other end to the pin 74. The members 94 and 96 are pivotally connected to the lever members 88 and 90 by the pin 99.

No claim is made to the motor 10, its control valve 44 and the linkage interconnecting the selector 36 with the valve, for this mechanism is described and claimed in the application of Harold W. Price, Serial No. 223,629, filed August 8, 1938, issued as Patent No. 2,241,071, dated May 6, 1941.

One of the most important parts of the mechanism constituting our invention, that is, the power means for actuating the valve operating link 66, will now be described in detail. As disclosed in Figure 1, there is provided a vacuum operated motor 100 secured to a flange 102, constituting part of the bracket 26. To a diaphragm 104 or power element of the motor there is connected a link 106, said link having a bent end portion 108 adapted to contact first one side and then the other of a cam 110, Figure 16, constituting a part of a lever member 112 pivotally connected at 114 to the bracket 26. This lever member is connected to the crank 64 by a link 116 pivotally connected to the member 112 at 118 and to the crank 64 at 120. As disclosed in Figure 7, the motor 100 is controlled by means of a valve 122, said valve being operated by a solenoid 124.

Figure 7:
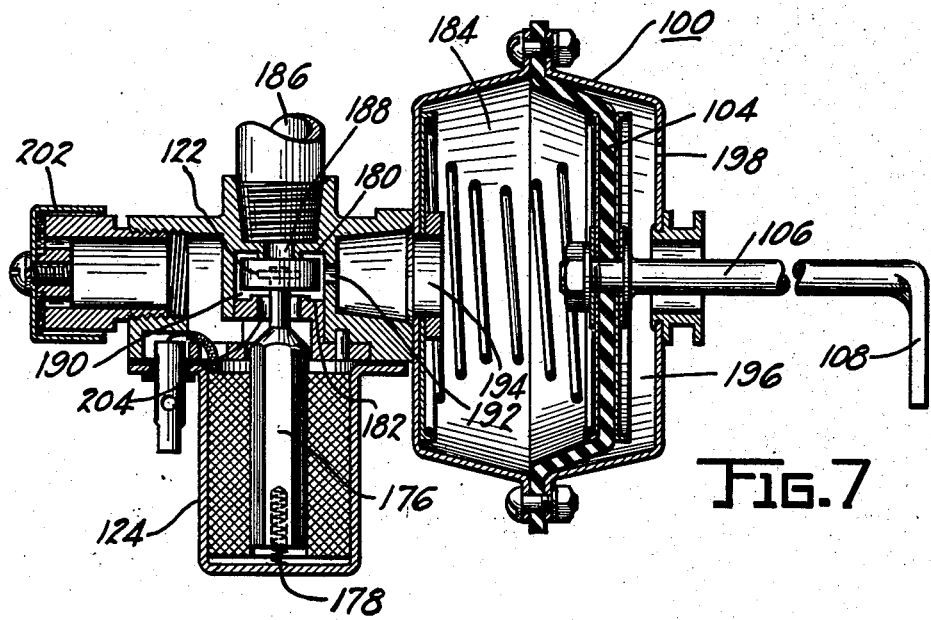
Figure 7 is a sectional view of the motor and control valve unit serving as part of one of the two mechanisms for operating the control valve of the motor disclosed in Figure 6.

Briefly describing the electrical mechanism for controlling the operation of the solenoid 124 which is disclosed in Figures 1, 2 and 7, the circuit includes a battery 126, wiring 128, a clutch operated switch 130, wiring 132 and a control unit 134, Figures 1 and 8, wired to the solenoid 124, said unit including a selector operated so-called cross-shift switch 136, a breaker switch 138 and a solenoid 140 for operating the breaker switch. A clutch operated switch 130 includes a fixed contact 131 and a movable contact 133 housed within a casing 135, the two contacts being biased into engagement with each other by a spring not shown. The contact 133 is held out of engagement with the contact 131 by means of a pin 137 rotatably mounted in the casing 135. The pin 137 is rotated by a crank 139 and the latter is rotated by means of a link 143 interconnecting the crank with the clutch pedal 142 when the clutch pedal is depressed to its fullest extent. The end of a plate 147, upon which the movable contact 133 is mounted, moves into contact with a flat portion 149 of the pin 137, thereby permitting the contacts 131 and 133 to move into engagement with each other to close the switch. As will be made clear hereinafter, the solenoid serves as a hold-down mechanism. The switch 130, disclosed in detail in Figure 13, is closed when the clutch pedal 142 has been depressed a certain amount and beyond a point necessary to completely disengage the clutch. As will be described in detail hereinafter, the breaker switch 138, normally biased by a spring 144 to the closed position disclosed in Figure 8, is opened by the solenoid 140, and the solenoid is energized to effect this operation by maintaining the clutch pedal operated switch 130 closed and by closing the so-called cross-shift switch 136, which is operated by the selector.

Describing now the complete operation of the mechanism constituting that embodiment of our invention hereinbefore described and, incidentally, describing the elements thereof more completely, it will be assumed that the engine is idling, thus producing a partial vacuum in its intake manifold, and that the selector 36 is in position to place the transmission in neutral. The vacuum motors 10 and 100 are then deenergized and their power elements 12 and 104 respectively are in the positions disclosed in Figures 6 and 7. Furthermore, the cross-shift switch 136 and the clutch operated switch 130 are opened, as disclosed in Figures 2 and 8, the breaker switch 138 is closed, and the solenoids 140 and 124 are accordingly deenergized.

Assuming that the driver of the vehicle wishes to place the transmission in low gear, he depresses the clutch pedal 142 to disengage the clutch: however, he does not move the pedal far enough to close the switch 130. If desired, a clutch spring 146 may be inserted to give the necessary feel, thus preventing the clutch pedal from being depressed to an extent to close the switch 130. The driver then rotates the selector 36 upwardly against the action of a spring 148 to move the link 30 downwardly and thus rotate the crank 24, place the link 22 in compression and rotate the crank 18 counterclockwise to effect a selection of the low and reverse shift rail of the transmission.

This shift rail having been selected for operation, the selector is rotated toward the driver, moving in a plane approximately parallel to the plane of the steering wheel 150. This movement results in a clockwise rotation of the tube 32 about its longitudinal axis, a clockwise rotation of the crank 64 and a movement of the link 66 to move the spool-shaped valve member 48 to the right, Figure 6. As the valve member 48 moves to the right, the connecting rod 54 moves to the left, for with movement of the pin 74 to the right, Figure 15, the lever members 94 and 96 are rotated about the pin 98, which remains stationary. This movement of the members 94 and 96 results in a movement of the lever members 88 and 90 about the pin 92. The pin 86 and connecting rod 54 connected therewith are accordingly moved simultaneously with the movement of the valve member 48, thus effecting a relatively rapid opening of the valve. This relative movement of the valve member and connecting rod is sufficient to place the port 60 in communication with a chamber 152 outlined by the spool-shaped valve member 48 and the hub portion 53 of the connecting rod 54. A chamber 154 of the motor 10 is thus placed in communication with the intake manifold, or any other suitable source of vacuum, such as a vacuum tank, not shown, via port 60, chamber 152, a duct 156, the hollow tube 52 and a conduit 158. A chamber 160 of the motor 10 is at the time vented to the atmosphere via a port 162 in a dust cover or boot member 164, ports 166 in the hollow connecting rod 54 and the port 58 in the hub portion 53 of the connecting rod 54. The piston 12 is then subjected to a differential of pressures, resulting in a movement thereof to the right. The shift rail operating crank 14, which is connected to the piston 12, is, of course, then rotated counterclockwise to move the low and reverse shift rail to place the transmission in low gear. Should the movement of the selector 36 be stopped before it reaches its low gear position, there results what is known in the art as a follow-up action of the valve 44.

Describing this follow-up operation, if movement of the valve member 48 is stopped, the connecting rod 54 continues to move to the right, until the valve parts are in the position disclosed in Figure 6. Air then rushes into the chamber 154 via ports 60, 168, 166 and 162, and the movement of the rod 54 and the piston 12 stops. If movement of the selector 36 should be stopped while the synchronizer mechanism of the transmission is functioning, the parts of the mechanism would probably be moved sufficiently to permit the rod 54 to move just enough to register the port 60 with a valve land 170. The whole system would then be in equilibrium and the valve would be lapped. However, both of the above-described operations of the valve mechanism are known as follow-up operations, the crank 14 following the movement of the selector 36. If the movement of the selector is uninterrupted, the motor piston is moved to place the transmission in low gear.

Assuming now that the transmission is in low gear, the driver then depresses the accelerator and at the same time releases the clutch. After the desired speed is reached, with the transmission in low gear, the driver will then probably desire to place the transmission in second gear. The accelerator is then released, the clutch again disengaged, and the selector 36 is then rotated counterclockwise. This movement results in a movement of the valve member 48 to the left, Figure 6, to register the port 58 with the valve chamber 152. The motor chamber 160 is thus placed in communication with the source of vacuum and the motor chamber 154 remains vented to the atmosphere. Again there results an energization of the motor, that is, the piston 12 or power element of the motor is subjected to a differential of pressures to move the same to the left. The shift rail operating crank 14 is accordingly rotated clockwise to place the transmission in second gear. During this second gear movement of the selector, it will, under the action of the springs 20 and 148, drop down when its intermediate or transmission neutral position is reached. However, this action, effecting as it does a selection of the second and high gear shift rail, is very fast and does not delay to any appreciable extent the operation of placing the transmission in second gear. As previously described, should the movement of the selector be stopped, there will result the follow-up action of the valve to also stop the movement of the crank 14. It may also be noted that in order to keep the valve open the driver must exert a force, known in the art as "feel," which is at all times directly proportional to the force exerted by the piston 12; for the piston transmits its load to the crank 14 through the so-called reactionary levers 88 and 90, which are secured to the crank 14 by the pin 92: and the driver, in order to keep the crank moving, must exert a force, acting through the pin 74, to keep the levers from rocking.

Describing in detail one of the most important features of our invention, the driver may control the second and high gear operations of the transmission operating motor 10 by operation of the clutch pedal. Again it will be assumed that the transmission is in neutral and the parts of the mechanism are in their relative positions disclosed in the drawings. Referring to the electrical mechanism disclosed in Figures 1, 2, 7, 8 and 9 and to the brief description of this mechanism heretofore given, when the clutch pedal is pressed all the way, that is, sufficiently to close the switch 130, there results an energization of the three-way valve operating solenoid 124, Figure 7. Referring to Figures 1 and 8 and to the electrical hook-up disclosed in Figure 2, the circuit to the solenoid 124 includes the battery 126, clutch pedal operated switch 130, movable contact 172 and fixed contact 174 of the breaker switch 138, the latter contact being wired directly to the winding of the solenoid. Armature 176 of the solenoid 124 moves downwardly, against the action of a spring 178, to move the valve member 122 off its seat 180 and onto a seat 182. A chamber 184 of the motor 100 is thus placed in communication with the intake manifold or other source of vacuum via a conduit 186, port 188, valve chamber 190 and ports 192 and 194. The chamber 184 is thus partially evacuated, and, inasmuch as a chamber 196 is vented to the atmosphere via port 198, it follows that the diaphragm 104 is subjected to a differential of pressures to move it to the left. The link 106 is thus moved to the left until the hooked end 108 thereof contacts a face 200 of the cam 110. Continued movement of the link 106 results in a counter-clockwise rotation of the lever member 112. There results an operation of the valve 44 effecting an energization of the motor 10, and the transmission is placed in second gear. Most transmissions of the day are so geared that the vehicle may be started in second gear. Accordingly, the hooked end member 108 is so positioned that if moved it will strike the face 200 of the cam 110 when the lever 112 is in its transmission neutral position.

The transmission having been placed in second gear, the clutch is released and the accelerator depressed to speed up the vehicle. Upon release of the clutch the switch 130 is opened, resulting in a deenergization of the solenoid 124. The spring 178 then returns the valve 122 to the position disclosed in Figure 7, thereby venting the motor chamber 184 to the atmosphere via an air cleaner 202 and port 204. After the desired speed of the vehicle is reached in second gear, the accelerator is released and the clutch is again disengaged to its full extent, or at least sufficiently to again close the switch 130. The solenoid 124 is accordingly again energized to operate the valve 122, and the motor 100 is again energized to move the hooked end 108 of the link 106 to the left. This time the end 108 contacts the side 206 of the cam 110, and continued movement serves to rotate the lever 112 clockwise to again open the valve 44. The motor 10 is accordingly again energized to place the transmission in high gear.

Subsequent depressions of the clutch to operate the switch 130 result in the transmission being alternately placed in second and high gear. However, it will be remembered that when the transmission is in neutral, preparatory to starting the vehicle, the lever 112 is in the position disclosed in Figures 1 and 16, and the first depression of the clutch pedal will, as previously described, result in a movement of the lever 112 to place the transmission in second gear. It should also be noted that, if the vehicle is stopped with the transmission either in low or in high gear and the clutch pedal is moved sufficiently to close the switch 130, the transmission will be placed in second gear.

An important feature of our invention lies in the means, preferably power means, for cutting out of operation the motor 100. This mechanism, which is disclosed in detail in Figures 2, 8 and 9 and which has been briefly described above, serves to overrule the clutch pedal control of the motor 100 to alternately place the transmission in second and high gears. This mechanism makes it possible for the driver to neutralize the transmission or to establish the transmission in any one of its gear settings by moving the selector 36 to any one of its four gear establishing positions or to its transmission neutral position. Any one of these settings of the transmission may be accomplished irrespective of the position from which the selector is moved and despite the closing of the switch 130 by depressing the clutch pedal its full extent. For example, if the selector is in its high gear position, and the transmission is, of course, established in high gear, then by moving the selector to its transmission neutral position the transmission is placed in neutral. Then, after the so-called cross-shift of the transmission is effected by moving the selector upwardly, the transmission may be placed in low gear, if the driver so wills, by moving the selector to its low gear position.

This so-called overruling operation of the mechanism is accomplished by a very slight upward movement of the selector, which movement takes place when the driver places his fingers on the lower side of a ball 208 on the end of the selector. This movement should, of course, be effected before the switch 130 is closed. However, in the operation of shifting gears, most drivers first place their hands on the selector and then depress the clutch pedal, and with the mechanism of our invention this results in closing the switch 136 before the clutch pedal is depressed sufficiently to close the switch 130. The above-mentioned very slight upward movement of the selector results in a movement of the link 30 downwardly, against the action of the spring 148. To the end of the link 30 there is pivotally connected a link 31 to which there is pivotally connected a link 210. As disclosed in Figures 8 and 9, the link 210 is connected to a lever 212, and through an opening in the end of the lever there is rotatably mounted a pin 214. A rectangular-shaped cam member 216 is secured to one end of the pin 214, and a spring 218, interposed between a washer 220 and the cam 216, serves to urge the washer 220 into contact with the lever 212. The pin 214 is prevented from moving inwardly and is accordingly held in place by a nut 222 so connected to the pin as to permit rotation thereof.

Continuing the description of the overruling operation, when the selector is moved slightly upwardly, the link 210 is moved in the direction of the arrow in Figure 8, against the resistance of a spring 224, and this movement effects a counterclockwise rotation of the lever 212. The cam 216, by virtue of its friction connection with the lever, is thus rotated, moving a leaf spring 226 upwardly to move contact 228 into engagement with contact 230.

Referring now to the electrical hook-up disclosed in Figure 2, when the switch 136 is closed and the switch 130 is then closed, as just described, the solenoid 140 is energized. This results in an armature 232 being moved upwardly, against the tension of the spring 144, to move the contact 172 into engagement with a contact 234. The circuit to the solenoid 124 is thus broken, resulting in the valve 122 remaining closed and making it impossible to energize the motor 100. There is accordingly no conscious act of the driver to overrule the clutch pedal control of shift motor 10, other than touching the selector; for in so touching the selector in all probability the lever 210 will be moved the very slight amount necessary to close the switch 136. After the selector has been moved to place the transmission in gear, a release of the selector results in the spring 224, aided by the spring 148, returning the lever 212 and cam 216 to their off positions disclosed in Figure 8. In this position, the cam contacts an adjustable stop 236.

There is thus provided power means, including the solenoid 140, controlled by the selector and clutch pedal operated switches operable to make it impossible to select a second gear or high gear operation of the transmission by an operation of the clutch pedal.

There is disclosed in Figures 10, 11 and 12 a modified form of power means for cutting out of operation the motor 100. In this embodiment of our invention, as with the embodiment previously described, the solenoid 124 is energized by depressing the clutch pedal all of the way. The circuit includes the battery and the clutch pedal operated switch, an armature 238, a movable contact member 240, and a fixed contact member 242 wired to the solenoid. When it is desired to control the shifter motor 10 entirely by the selector, a very slight upward movement thereof will result in a slight rotation of a crank 244, Figure 10. This results, through the intermediary of a spring 246 and a washer 248, in the rotation of a pin 250, which is journaled in bearings provided by the curved ends 252 and 254 of a U-shaped plate 256. The plate is fixedly secured to the side of the housing 258, within which is secured a solenoid 260. An insulation-covered pin 262 also extends through the curved end 264 of a relatively narrow strip of metal extending from the side wall of the housing 258. The end of the strip serves as a support for the pin 262. Rotation of the crank 244 results in a movement of the pin 262 into contact with the armature 238, rotating the same against the tension of a spring 266 about the point 268 as a pivot into contact with the core 270 of the solenoid 260. In this operation of the armature, the contact 242 abuts a contact 272 wired to the winding of the solenoid 260.

With this mechanism, when the driver of the vehicle wishes to control the operation of the transmission by the selector, he first lifts up the selector sufficiently to bring contact 240 into abutment with contact 272, and then disengages the clutch sufficiently to close the switch 130. This results in an energization of the solenoid 260 to thereby maintain the contacts 240 and 272 in abutment and the solenoid energized, for after making the electrical circuit via the aforementioned contacts the solenoid 260 remains energized to maintain the circuit despite a release of the crank 244 and the resultant pull from the spring 266. Thus, with the modification disclosed in Figures 10 and 11, should the driver, either inadvertently or by design, remove his hand from the selector before the desired shift is completed, the motor 100, despite this action, would remain inoperative, provided, of course, that the clutch pedal remained depressed sufficiently to close the switch 130.

There is disclosed in Figure 4 the preferred embodiment of our invention, wherein a manually operated pedal member, which may be the accelerator of the vehicle, serves as the control element of mechanism for operating the throttle, the transmission and the clutch of the vehicle. In this embodiment of our invention, the electrical mechanism and the mechanism operated and/or controlled thereby are identical to the mechanisms of the previously described embodiments, with the exception that for the clutch pedal operated switch there is substituted a switch 274 operated by the heel portion of the accelerator 276 of the vehicle. Parts of the mechanism of Figure 4 which duplicate the parts of the mechanism of Figure 1 are identified by like reference numerals in both figures. The clutch pedal of the mechanism of Figure 4 is operated by a single-ended vacuum motor 278, the pedal being connected by a rod 280 to the piston or power element 282 of the motor. A suction compartment of the motor is connected by a conduit 284 to the intake manifold 286. A three-way valve 288, disclosed in detail in Figure 17, is incorporated in the conduit 284 and is connected to the accelerator by a rod 290. The accelerator is connected to the throttle lever 292 by a link 294, the throttle lever passing through a slot 296 to provide a lost-motion connection.

Describing the operation of this mechanism and incidentally completing the description thereof, upon release of the accelerator, a spring 298 closes the throttle. Upon continuing the release movement of the accelerator, a spool-shaped valve member 300 of the three-way valve 288 is moved to the position disclosed in Figure 4, thereby interconnecting the manifold 286 with the compartment 302 of the motor 278 via the conduit 284 and ports 304 and 306 in the valve 288. With the engine idling and the manifold thus partly evacuated, the compartment 302 is partly evacuated, thereby subjecting the piston 282 to a differential of pressures, resulting in its movement to the left to disengage the clutch. Should the driver then desire to place the transmission in second gear, he merely has to depress the heel portion of the accelerator 276, rocking it about its pivot 308. This action serves to move a rod 310 to close the switch 274 and initiate a second gear operation of the transmission operating mechanism, all as previously described in detail. After the operation of the transmission is completed, the switch 274 is opened by the first part of the movement of the accelerator, thereby deenergizing the motor 278. The next increment of movement of the accelerator results in a closing of the valve 288, that is, a movement of the same to vent the compartment 302 of the motor 278 to the atmosphere via ports 312 in the valve 288 and the conduit 284. The clutch is thus permitted to engage and the parts of the mechanism, including a slot 314, are so constructed and arranged that the opening of the throttle is initiated just as the clutch plates are contacting during the clutch engaging movement. The next closing operation of the switch 274 by again depressing the heel portion of the accelerator will result in the transmission being placed in high gear, which operation of the mechanism has also been described in detail.

It is an important feature of the invention disclosed in Figure 4 that the juncture of the conduit 284 with the conduit 186 lies between the valve 288 and the motor 278, and the construction of the parts, including the interior diameter of the conduits, is such that the clutch is disengaged before the gears of the transmission are brought into mesh. It is to be noted that with the mechanism of Figure 4 the accelerator must be released before the clutch may be disengaged and must be further operated, that is, its heel portion must be depressed, before the transmission may be operated. The accelerator thus becomes a common control for the throttle, the transmission and the clutch of the vehicle, for with the mechanism disclosed in Figure 4 neither the clutch nor the transmission is operated until the throttle is closed, which, of course, is the operation desired: and the transmission is not operated, that is, the gears are not meshed, until the clutch is disengaged, which is also desired. It should also be noted that the accelerator becomes a selectively operable foot operated member cooperating with the hand operated selector located beneath the steering wheel to control the throttle, clutch and transmission of the vehicle.

There is disclosed in Figure 5 yet another embodiment of our invention: the parts of the mechanism which are duplicates of the parts disclosed in Figure 4 are accordingly given identical reference numerals. The mechanism of Figure 5 constitutes an improvement over that of Figure 4 in that a clutch pedal operated switch 316, wired in parallel with the accelerator operated switch 274, provides an additional control for the transmission operating power means.

Describing the mechanism of Figure 5 and its operation, a clutch operating crank 318 is connected to the piston 282 of the vacuum motor 278 by the rod 280, and a pin 320 which is connected to the crank 318, if moved far enough, contacts the switch operating member 316. With normal operation of the mechanism, the switch 316 is never closed, inasmuch as energization of the motor 278 with release of the accelerator does not move the piston 282 and the pin 280 far enough to accomplish this result. However, should the driver desire to shift the gears of the transmission from high to second or vice versa, he may accomplish this by depressing the clutch pedal 142, which is loosely mounted on the clutch shaft 322. The first movement of the pedal effects a disengagement of the clutch, the pedal moving the crank 318 by means of a plate 324, contactible with the crank 318. Further movement of the clutch pedal results in movement of the crank 318 and the pin 320 far enough to effect a closing of the switch 316 to effect an operation of the transmission. With the mechanism of Figure 5 there are provided three separate and distinct manually operated members for controlling the operation of the throttle, clutch and transmission. The transmission may be placed alternately in second and high gear by the power means for operating the valve 44, and said power means may be controlled by either one of two foot operated members, namely, the accelerator pedal and the clutch pedal.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In an automotive vehicle provided with a selective transmission and a steering wheel, means including a selector mounted beneath the steering wheel for effecting a rail selecting operation of the transmission, power means for establishing the transmission in gear including a pressure differential operated motor operably connected to the transmission, valve means for controlling the operation of the motor, means for operating the valve including the aforementioned selector and linkage interconnecting the selector and valve, and further including power means comprising a pressure differential operated motor, a valve for controlling the operation of the latter motor, and foot operated means for in part controlling the operation of the last-mentioned valve.

2. In an automotive vehicle provided with an intake manifold, a throttle, a clutch and a change-speed transmission, power means for operating the clutch including a pressure differential operated motor, power means including a pressure differential operated motor for operating the transmission to establish the same in gear, force transmitting means for operating the throttle, valve means for controlling the operation of said motors including a three-way valve, a conduit directly connecting said three-way valve with the manifold, and a foot operated throttle, clutch and transmission control member connected to said valve and to said throttle operating force transmitting means, said member, when in its depressed position, serving to so move the force transmitting means as to open the throttle, and said member further serving, in its released position, to so operate the aforementioned valve as to initiate a clutch disengaging operation of the clutch operating motor, said member further serving, when rocked counterclockwise by the heel of the driver, to effect an operation of the transmission operating power means.

3. Power means for operating a three-speeds forward and reverse transmission of an automotive vehicle, said vehicle being provided with a clutch pedal and a steering wheel, said power means comprising, in combination, a pressure differential operated motor operably connected to the transmission, a valve for controlling the operation of said motor, and means for operating said valve including a hand operated selector mounted adjacent the steering wheel of the vehicle, force transmitting means interconnecting said selector and valve, and power means for so operating said force transmitting means as to effect first a second gear establishing operation of the motor and then a high gear establishing operation thereof, said power means including a pressure differential operated motor, a three-way valve for controlling the operation of said motor, power means for operating said latter valve, and means for controlling the operation of said valve operating power means including a clutch pedal operated switch.

4. In an automotive vehicle provided with an accelerator, a throttle, an intake manifold, a clutch and a change-speed transmission, means for operating the throttle, clutch and transmission comprising, in combination, a vacuum motor, the power element thereof being connected to the clutch, another vacuum motor having its power element connected to the transmission, a control valve for said transmission operating motor, linkage interconnecting the accelerator and throttle, a conduit interconnecting the manifold and clutch operating motor, a three-way valve incorporated in said conduit, linkage interconnecting said valve and accelerator, a conduit interconnecting the transmission operating motor and that portion of the aforementioned conduit interconnecting the valve and clutch motor, means for operating the control valve of the transmission operating motor, said means including a switch operated by the accelerator.

5. In an automotive vehicle provided with an intake manifold, a throttle operating accelerator, a clutch and a change-speed transmission, power means for operating the clutch and transmission including a vacuum motor having its power element connected to the clutch, another vacuum motor having its power element connected to the transmission, a valve for controlling the operation of said transmission operating motor, a fluid transmitting conduit interconnecting the intake manifold with the clutch operating motor, another fluid transmitting conduit interconnecting the aforementioned conduit with the transmission operating motor, an accelerator operated control valve for said motors incorporated in said first-mentioned conduit, means for operating the transmission operating motor control valve, and power means for operating said means, said power means including an electrical switch located beneath the heel portion of the accelerator.

6. In an automotive vehicle provided with a clutch pedal, a steering post, a steering wheel and a change-speed transmission having a plurality of shift rails, means for selecting a rail to be actuated including a hand operated selector mounted on the steering post immediately beneath the steering wheel, a crank extending from the casing of the transmission, force transmitting means interconnecting said crank and selector, means for actuating the selected shift rail to thereby place the transmission in the desired gear ratio, said means including a pressure differential operated motor, a control valve for said motor, force transmitting means interconnecting a part of said control valve with the aforementioned selector, power means for actuating said last-mentioned force transmitting means, and means operated by said clutch pedal and by said selector for controlling the operation of said power means.

7. In an automotive vehicle provided with a clutch pedal, a steering wheel and a change-speed transmission having a plurality of shift rails, means for selecting a shift rail to be operated, and means controlled in part by the clutch pedal for moving the selected rail to thereby establish the transmission in gear, both of said means including a selector member mounted beneath the steering wheel, and further including means controlled in part by said selector for rendering the clutch pedal inoperative as part of the means for establishing the transmission in gear.

8. In an automotive vehicle provided with a clutch pedal and a change-speed transmission, power means for operating the transmission to establish the same in gear, said means including a pressure differential operated motor operably connected with the transmission, a valve for controlling the operation of said motor, means for operating said valve including a lever member one side of which is irregularly shaped, linkage interconnecting said lever member and valve, and means, cooperating with said irregularly-shaped side of the lever member, for so operating said lever member as to alternately place said linkage in compression and tension, said latter means including a pressure differential operated motor and clutch pedal operated means for controlling the operation of said motor.

9. In an automotive vehicle provided with a steering wheel, an accelerator, a clutch pedal and a change-speed transmission, means for operating the transmission to establish the same in the desired gear ratio comprising, in combination, a pressure differential operated motor having its power element operably connected to the transmission, valve means for controlling the operation of the motor, and means for operating said valve including a selector mounted adjacent the steering wheel and within easy reach of the driver, means interconnecting said selector and valve, means operated by the accelerator pedal, and means operated by the clutch pedal.

HAROLD W. PRICE.
EARL R. PRICE.